United States Patent
Lai

(10) Patent No.: US 8,520,907 B2
(45) Date of Patent: Aug. 27, 2013

(54) SENDING A DIGITAL IMAGE METHOD AND APPARATUS THEREOF

(75) Inventor: Kun-Hui Lai, Taipei (TW)

(73) Assignee: Inventec Corporation, Taipei (TW)

( * ) Notice: Subject to any disclaimer, the term of this patent is extended or adjusted under 35 U.S.C. 154(b) by 383 days.

(21) Appl. No.: 12/982,876

(22) Filed: Dec. 31, 2010

(65) Prior Publication Data

US 2012/0134545 A1    May 31, 2012

(30) Foreign Application Priority Data

Nov. 30, 2010  (TW) .............................. 99141498 A

(51) Int. Cl.
*G06K 9/00* (2006.01)
*H04N 7/14* (2006.01)

(52) U.S. Cl.
USPC ..................... 382/118; 382/115; 348/14.02

(58) Field of Classification Search
USPC .............. 382/115, 118, 218, 219, 305, 312; 348/14.02, 14.08; 707/705; 715/233; 396/429
See application file for complete search history.

(56) References Cited

U.S. PATENT DOCUMENTS

| | | | | |
|---|---|---|---|---|
| 7,774,719 | B2 * | 8/2010 | Taylor | 715/838 |
| 7,831,141 | B2 * | 11/2010 | Wassingbo et al. | 396/429 |
| 8,144,939 | B2 * | 3/2012 | Thorn | 382/115 |
| 8,224,272 | B1 * | 7/2012 | Zhang et al. | 455/133 |

FOREIGN PATENT DOCUMENTS

| | | |
|---|---|---|
| TW | 466452 | 12/2001 |
| TW | 200825899 | 6/2008 |
| TW | 200943956 | 10/2009 |

* cited by examiner

*Primary Examiner* — Sheela Chawan
(74) *Attorney, Agent, or Firm* — CKC & Partners Co., Ltd.

(57) ABSTRACT

An automatically sending digital image method for a portable communication apparatus is disclosed. The apparatus has multiple contact person data. Each contact person data corresponds to a contact person and includes a face photograph and an E-mail address. The method comprises the steps of gathering a digital image; recognizing a face picture of the digital image; comparing the face picture of the digital image with the face photograph of each contact person; setting the contact person as a picture contact person when the face picture of the digital image matches the face photograph of the contact person; selecting multiple communication contact persons from the contact persons based on the picture contact persons according to a sending mode; attaching the digital image to an E-mail; and sending the E-mail to the E-mail addresses of the communication contact persons.

14 Claims, 3 Drawing Sheets

US 8,520,907 B2

SENDING A DIGITAL IMAGE METHOD AND APPARATUS THEREOF

RELATED APPLICATIONS

This application claims priority to Taiwan Application Serial Number 099141498, filed Nov. 30, 2010, which is herein incorporated by reference.

FIELD OF INVENTION

The present invention relates to automatically sending digital images method and apparatus thereof. More particularly, the present invention relates to use a face recognition technology to automatically sending digital images to contact persons method and apparatus thereof.

DESCRIPTION OF RELATED ART

The 3C (computer, communication, consumer) products have more and more popularized for personal usage because of the cheaper price, especially the digital camera. When a user uses the digital camera to take a photograph, the user can detect this photograph and cancel this photograph he did not want instantly. Moreover, the user also can select the photographs he wanted to develop. This lower usage cost has made the digital camera replace the typical camera.

Especially, when a user participates a party of relatives or friends, he can use a digital camera to take group photographs as a souvenir. Then, these group photographs can be sent to the participants by the user through an E-mail after the party is over. However, in a typical case, the photographer usually forgets to mail these group photographs to the participants because of his personal reasons.

Or, the group photographs are sent to all participants by the photographer because the photographer is unwilling to classify these photographs and send classified photographs to corresponding participants. However, such sending method causes the party participants to receive some irrelevant photographs. On the other hand, when these group photographs are sent to the participants by E-mail, the photographer needs to check these group photographs to classify these group photographs and attach these classified photographs to E-mails and input corresponding addresses in the E-mail. This is a heavy loading for the photographer and reduce the willingness of the photographer to send these group photographs to corresponding participants.

Therefore, a method and apparatus that can reduce the loading of sending photographs to corresponding party participants and prevent the party participants to receive irrelevant photographs are needed.

SUMMARY

This present invention provides a method to use a face recognition technology to automatically attach and send digital images to contact persons. This method can reduce the loading of a photographer to send photographs to corresponding party participant.

The present invention provides an automatically sending digital image method for a portable communication apparatus. The portable communication apparatus has a plurality of contact person data. Each contact person data corresponds to a contact person and includes a face photograph and an E-mail address. The automatically sending digital image method comprises the steps of gathering a digital image; recognizing a face picture of the digital image; comparing the face picture of the digital image with the face photograph of each contact person; setting the contact person as a picture contact person when the face picture of the digital image matches the face photograph of the contact person; selecting multiple communication contact persons from the contact persons based on the picture contact persons according to a sending mode and; attaching the digital image to an E-mail; and sending the E-mail to the E-mail addresses of the communication contact persons.

In an embodiment, the sending mode is an individual sending mode, and the communication contact persons are set as the picture contact persons.

In an embodiment, the sending mode is a group sending mode, wherein multiple predetermined sending groups are set, each predetermined sending group includes multiple predetermined contact persons from the contact persons, and one of the predetermined sending groups is selected as a communication group based on the picture contact person such that the communication contact persons are set as the predetermined contact persons of the communication group. The predetermined contact persons of the communication group include the picture contact persons.

In an embodiment, multiple selected sending groups are selected form the predetermined sending groups, wherein the predetermined contact persons of each selected sending group includes the picture contact persons. The communication group is set as one of the selected sending groups such that the number of the predetermined contact person of the selected sending group are the least among the selected sending groups.

In an embodiment, multiple selected sending groups are selected from the predetermined sending groups, wherein the predetermined contact persons of each selected sending group includes the picture contact persons, and the communication group is set as one of the selected sending groups such that the number of the predetermined contact person of the selected sending group are the most among the selected sending groups.

In an embodiment, the digital image is took by the portable communication apparatus in a first event.

In an embodiment, the method further comprising: setting a time period; and determining the first event terminating when no digital image is took by the portable communication apparatus in the time period.

In an embodiment, the time period is four hours.

The present invention also provides an automatically sending digital image apparatus, comprising: a storage module, wherein the storage module stores multiple contact person data, and each contact person data corresponds to a contact person and includes a face photograph and an E-mail address of the contact person; a gathering image module to gather a digital image; an image processor receiving the digital image, wherein the image processor further comprises: an image recognizing module to recognize a face picture of the digital image; and an image comparison module to compare the face picture of the digital image with the face photograph of each contact person, wherein the contact person is set as a picture contact person when the face picture of the digital image matches the face photograph of the contact person; and a communication module to select multiple communication contact persons from the contact persons based on the picture contact persons according to a sending mode, and to attach the digital image an E-mail, wherein the E-mail is mailed to the E-mail addresses of the communication contact persons.

In an embodiment, the sending mode is an individual sending mode. The communication contact persons are set as the picture contact persons.

In an embodiment, the sending mode is a group sending mode, wherein multiple predetermined sending groups are set, each predetermined sending group includes multiple predetermined contact persons from the contact persons, and one of the predetermined sending groups is selected as a communication group based on the picture contact persons such that the communication contact persons are set as the predetermined contact persons of the communication group. The predetermined contact persons of the communication group include the picture contact persons.

In an embodiment, multiple selected sending groups are selected from the predetermined sending groups, wherein the predetermined contact person of each selected sending group includes the picture contact persons, and the communication group is set as one of the selected sending groups such that the number of the predetermined contact person of the selected sending group are the most among the selected sending groups.

In an embodiment, multiple selected sending groups are selected from the predetermined sending groups, wherein the predetermined contact persons of each selected sending group includes the picture contact persons, and the communication group is set as one of the selected sending groups such that the number of the predetermined contact person of the selected sending group are the most among the selected sending groups.

In an embodiment, wherein the gathering image module is a charge coupled device (CCD) or a complementary metal oxide semiconductor (CMOS).

Accordingly, the present invention provides a method and apparatus to use a face recognition technology to recognize the face in a photograph. Then, the recognized faces are compared with the faces of the contact persons to determine the persons to receive this photograph. Then, this paragraph is automatically attached to an E-mail to mail to the E-mail addresses of the determined persons. This method can reduce the loading of a photographer to select and send photographs to corresponding party participant. This method also can prevent the party participants from receiving irrelevant photographs.

BRIEF DESCRIPTION OF THE DRAWINGS

The invention can be more fully understood by reading the following detailed description of the embodiments, with reference made to the accompanying drawings as follows.

DETAILED DESCRIPTION

Although the photographs took by a digital camera can be sent to corresponding party participant by E-mail, in a typical sending method, the photographer needs to select the correct photographs and attach the selected photographs to an E-mail first. Then, the photographer also needs to input the address to the E-mail. Finally, the photographs can be sent to the corresponding party participant. This is a heavy loading for the photographer. Therefore, the present invention provides a method to use a face recognition technology to recognize the face in a photograph. Then, the recognized faces are compared with the faces of the contact persons to determine the persons to receive this photograph. In the claimed invention, the E-mail addresses of the persons to receive this photograph are related to this photograph. That is, this photograph is automatically attached to an E-mail to mail to the E-mail addresses related to the photograph. This method can reduce the loading of a photographer to select and send photographs to corresponding party participant. This method also can prevent the party participants from receiving irrelevant photographs.

In the claimed invention, the photograph is a digital image and took by a digital camera. Then, the photograph is sent to a communication end to transmit to corresponding receiver. In an embodiment, the communication end is a personal computer, a notebook, a tablet personal computer or a portable communicator. In another embodiment, the digital camera is a digital camera module embedded in a portable communicator, such a cellular phone or personal digital assistant.

Figure 1:
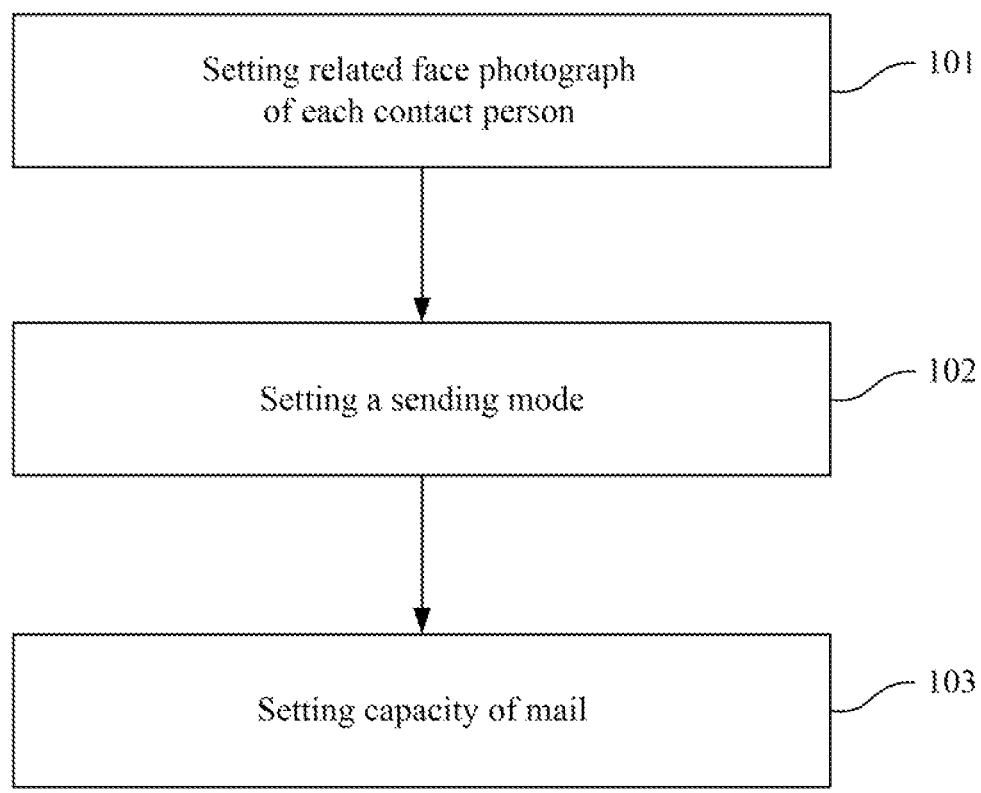
FIG. 1 illustrates a flow chart to set parameters according to an embodiment of the claimed invention.

According to the present invention, the parameters stored in the computer end need to be set first to automatically send photographs to corresponding persons by E-mail. FIG. 1 illustrates a flow chart to set parameters according to an embodiment of the present invention. In step 101, a related face photograph of each contact person is set. In an embodiment, a digital camera takes the face photograph of each contact person. The face photograph is connected to corresponding contact person data. Therefore, each contact person data comprises his face paragraph and E-mail address. The face paragraph is used as a reference data during the recognizing process. Accordingly, when a face recognition technology is set to recognize the face in a photograph, the face picture in a photograph is compared with the face photographs of contact persons. When a face picture of a person in the photograph matches a face photograph of a contact person, this contact person is set as a picture contact person. Then, communication contact persons are selected from the contact persons based on the picture contact person according to a sending photograph mode. The detailed operation method is described in the following paragraph. This photograph is sent to the communication contact persons.

Next, is step 102, the sending photograph mode is set. The sending photograph mode includes an individual sending mode and a group sending mode. In the individual sending mode, the picture contact person is the communication contact person. The photograph is only sent to the picture contact person. In the group sending mode, multiple predetermined sending groups are set. Each predetermined sending group includes multiple predetermined contact persons from the contact persons. Then, one of the predetermined sending groups is selected as a communication group based on the picture contact persons such that the communication contact persons are set as the predetermined contact persons of the communication group. The photograph is sent to the predetermined contact persons of the communication group.

In an embodiment, when A contact person and B contact person are recognized in photographs after a terminating event, the A contact person and B contact person are set as picture contact persons. Accordingly, in individual sending mode, the picture contact persons are directly set as the communication contact persons. Therefore, the photographs are sent to the A contact person and B contact person. On the other hand, in the group sending mode, the picture contact persons are compared with the predetermined contact persons in each predetermined sending group to select one of the predetermined sending groups, which includes the A contact person and B contact person as a communication group. Then, the photographs are sent to the predetermined contact persons. In an embodiment, the number of the predetermined contact person of the selected sending group are the least among the selected sending groups. In another embodiment, the number of the predetermined contact person of the selected sending group are the most among the selected sending groups:

For example, four predetermined sending groups are set in a communication end. The first sending group includes three predetermined contact persons, A contact person, B contact person and C contact person. The second sending group includes three predetermined contact persons, A contact person, D contact person and E contact person. The third sending group includes five predetermined contact persons, A contact person, C contact person, E contact person, F contact person and G contact person. The fourth sending group includes four predetermined contact persons, A contact person, C contact person, F contact person and G contact person. When A contact person and B contact person are recognized in photographs, the A contact person and B contact person are set as picture contact persons. Accordingly, the picture contact persons are compared with the predetermined contact persons in the four sending groups respectively. The first sending group includes the picture contact persons and the number of the predetermined contact person of the first sending group is the least. Therefore, the first sending group is selected as the communication group. The photographs are sent to the predetermined contact persons, A contact person, B contact person and C contact person of the communication group. In another embodiment, when A contact person, B contact person and G contact person are recognized in photographs, A contact person, B contact person and G contact person are set as picture contact persons. Accordingly, the picture contact persons are compared with the predetermined contact persons in the four sending groups respectively. The third sending group includes the three picture contact persons and the number of the predetermined contact person of the third sending group is the least. Therefore, the third sending group is selected as the communication group. The photographs are sent to the predetermined contact persons, A contact person, C contact person, E contact person, F contact person and G contact person, in the communication group. In another embodiment, when A contact person, D contact person and G contact person are recognized in photographs, A contact person, D contact person and G contact person are set as picture contact persons. Accordingly, the picture contact persons are compared with the predetermined contact persons in the four sending groups respectively. However, no sending group includes the three contact persons. Therefore, in an embodiment, the flow chart can change the group sending mode to the individual sending mode. The photographs are only sent to the A contact person, D contact person and G contact person. In another embodiment, the flow chart can require the user to renew the predetermined contact persons in each sending group.

The advantages of using the group sending mode is to make sure a contact person related to the picture contact persons can also receive this photograph. For example, A contact person, B contact person and C contact person are good friends and are set in a same sending group. When C contact person does not participate a party but A contact person and B contact person participate this party, in individual sending mode, only A contact person and B contact person can receive this photograph. However, C contact person wants this photograph, too. At this time, the photographer has to send this photograph to C contact person again. Therefore, by group sending mode, A contact person, B contact person and C contact person can receive the photograph.

Next, is step 103, the capacity of mail to attach photographs and the method to determine an event is set. The photographs are sent to corresponding contact persons by E-mail. When the attached photograph in an E-mail is too large, it is possible for this E-mail to be rejected by mail server. Therefore, in the present invention, the capacity of mail to attach photographs is set.

In this step, an upper limit volume of mail capacity is set. In an embodiment, when the set upper limit volume of capacity of mail to attach photographs is 10 Mb, if the volume of the attached photographs is over 10 MB, the mail is divided to several mails by the system based on the set 10 Mb, then, the mails are send to corresponding contact persons. On the other hand, the main purpose to determine an event is to determine the range to process the photographs. For example, a photographer continuously participate two parties, a first party and a second party. However, the photographer only wants to send the photographs took in the first party to corresponding contact persons. That is, it is not necessary to recognize the photographs took in the second party. If the photographs took in the two parties are recognized at the same time, it will cost a lot of time and possible to send the photographs took in the second party to the participants in the first party.

Therefore, the present invention provides a time period to determine the processing photographs range. In an embodiment, when no photographs are took in a time period, the event is deemed to be terminated. That is, the photographs took after this time period is supposed happening in the new event, the second party. The photographs took before this time period is supposed happening in an old event, the first party. Accordingly, the photographs can be processed based on event. For example, a four hour time period is set. When no photographs are took in the four hour time period since the moment taking the last photograph, the event (the first party) is deemed to be terminated. That is, the photographs took after this four hour time period is supposed belonging to the new event(the second party). The photographs took before this four hour time period is supposed belonging to the old event.

It is noticed that, the time period can be set based on the usage situation of the user. In another embodiment, the photographer also can set contact persons. That is, all took photographs are only sent to the set contact persons.

Figure 2:
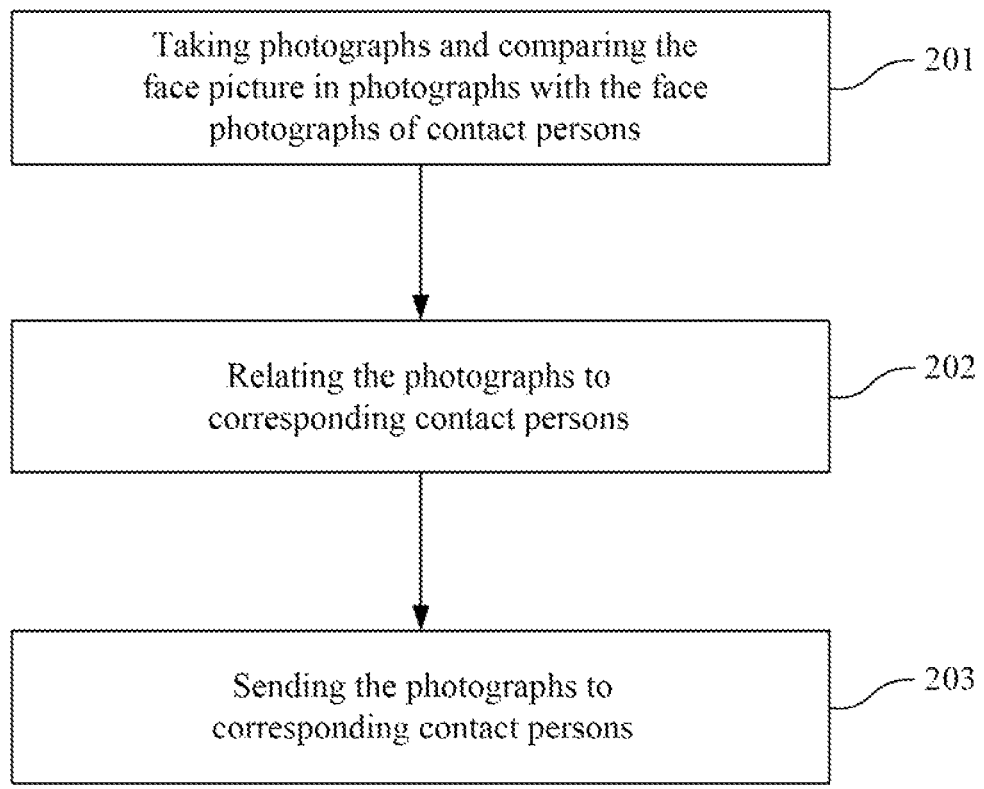
FIG. 2 illustrates a flow chart to take a photograph according to an embodiment of the present invention.

When the above parameters are set already, a user can take photographs and send photographs to corresponding contact persons based on the set parameters. FIG. 2 illustrates a flow chart to take a photograph according to an embodiment of the present invention. In step 201, photographs are took and the face pictures in this photographs are compared with the face photographs of contact persons. In an embodiment, when a photograph is took, the system automatically compares the face picture in this photograph with the face photographs of contact persons in a memory. A face recognition technology, such as a Picasa software, is used to recognize the face in a photograph.

In step 202, when the face of a person in the photograph matches a face is photograph of a contact person, the photograph is related to this contact person. For example, when the face of a person in the photograph matches a face photograph of a contact person, this contact person is set as a picture contact person. That is, the photograph is related to this contact person.

In step 203, the photographs are sent to the related contact persons in an event. For example, after the photographs are connected to corresponding contact persons and picture contact persons are set, communication contact persons are selected from the contact persons based on the picture contact persons according to a sending mode. Then, the photographs are attached to an E-mail to mail to the E-mail addresses of the communication contact persons. In an embodiment, the sending photograph mode includes individual sending mode and a group sending mode. In the individual sending mode, the picture contact persons are the communication contact persons. The photographs are only sent to the picture contact persons. In the group sending mode, multiple predetermined sending groups are set. Each sending group includes multiple predetermined contact persons. Then, one of the predetermined sending groups is selected as a communication group based on the picture contact persons. The photograph is sent to the predetermined contact persons of the communication group. It is noticed that when the photographs are attached to the mail, the system will check the volume of attached photographs to determine whether or not the volume of the attached photographs is over the set upper limit volume. When the volume of the attached photographs is over the set upper limit volume, the mail is divided to several mails by the system, then, the mails are send to corresponding contact persons.

Figure 3:
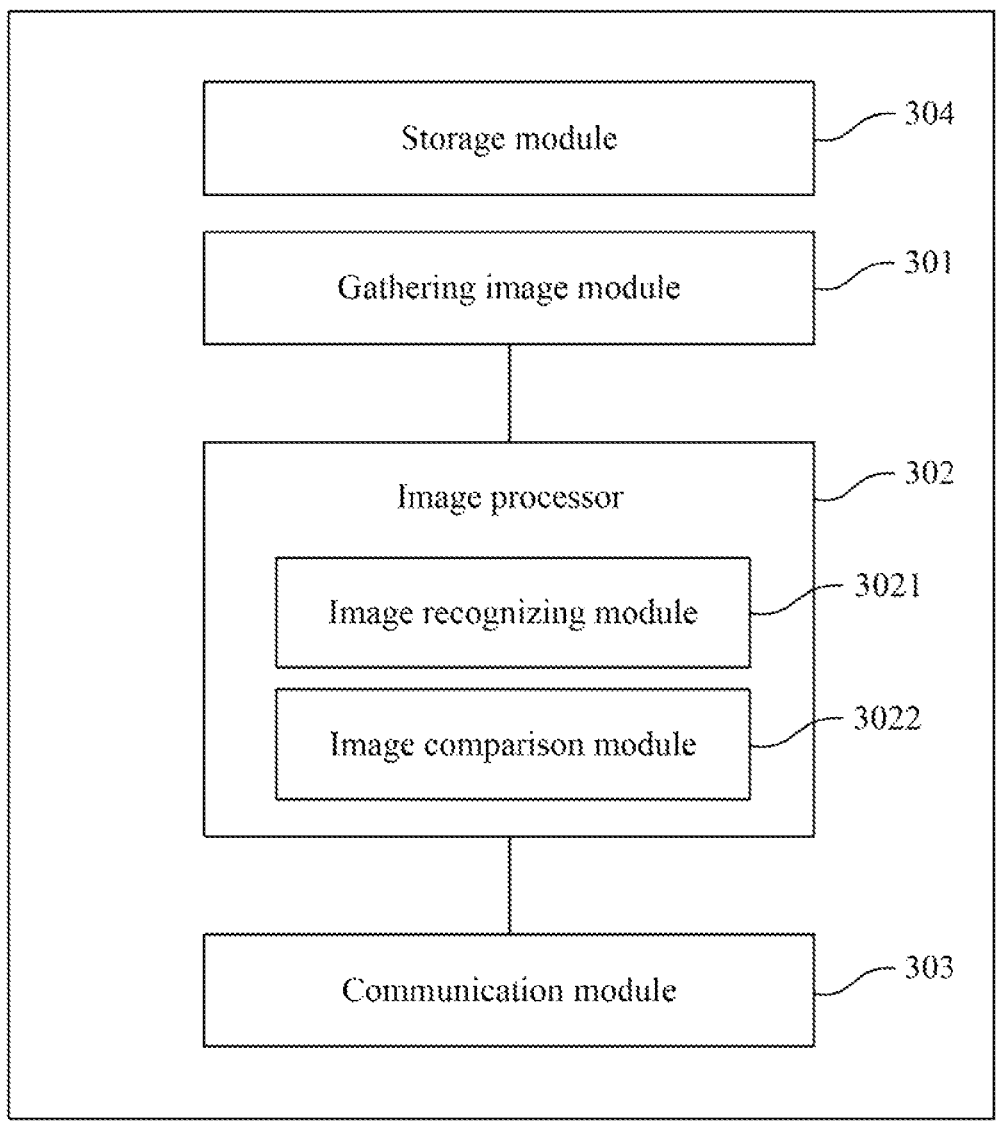
FIG. 3 is a schematic diagram of a portable apparatus that can automatically recognize and send photographs to corresponding party participant.

FIG. 3 is a schematic diagram of a portable apparatus that can automatically recognize and send photographs to corresponding party participant. The portable apparatus 300 includes a gathering image module 301, an image processor 302, a communication module 303 and a storage module 304. The portable apparatus 300 is a digital camera or a portable apparatus with communication function. The storage module 304 stores a plurality of contact person data. Each contact person data includes a face photograph and an E-mail address of the contact person. The gathering image module 301 gathers a digital image, such as a photograph. A charge coupled device (CCD) or a complementary metal oxide semiconductor (CMOS) is used to gather the photograph. The image processor 302 receives the photograph gathered by the gathering image module 301. In an embodiment, the image processor 302 further comprises an image recognizing module 3021 and an image comparison module 3022. The image recognizing module 3021 is a face recognition software to recognize the face picture in the photograph gathered by the gathering image module 301. The image comparison module 3022 compares the face picture in this photograph with the face photographs of contact persons stored in the storage module 304 to determine whether or not the face picture in this photograph matches the face photographs of contact persons. Once the face of a person in the photograph matches a face photograph of a contact person, the contact person is set as a picture contact person by the image processor 302. Finally, the communication module 303 selects communication contact persons from the contact persons based on the picture contact persons. Then, the photographs are attached to an E-mail to mail to the E-mail addresses of the communication contact persons.

Accordingly, the present invention provides a method to use a face recognition technology to recognize the face in a photograph. Then, the recognized faces are compared with the faces of the contact persons to determine the persons to receive this photograph. Then, this photograph is automatically attached to an E-mail to mail to the E-mail addresses of the determined persons. This method can reduce the loading of a photographer to select and send photographs to corresponding party participant. This method also can prevent the party participants from receiving irrelevant photographs.

Although the present invention has been described in considerable detail with reference to certain embodiments thereof, other embodiments are possible. Therefore; it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An automatically sending digital image method, wherein the method is used in a portable communication apparatus, the portable communication apparatus has a plurality of contact person data, each contact person data corresponding to a contact person and including a face photograph and an E-mail address of the contact person, the automatically sending digital image method comprising the steps of:
   (a) gathering a digital image;
   (b) recognizing a face picture of the digital image;
   (c) comparing the face picture of the digital image with the face photograph of each contact person;
   (d) setting the contact person as a picture contact person when the face picture of the digital image matches the face photograph of the contact person;
   (e) selecting multiple communication contact persons from the contact persons based on the picture contact persons according to a sending mode;
   (f) attaching the digital image to an E-mail; and
   (g) sending the E-mail to the E-mail addresses of the communication contact persons,
   wherein the digital image is took by the portable communication apparatus in a first event, further comprising:
   setting time period;
   determining the first event terminating, when no digital image is took by the portable communication apparatus in the time period; and
   performing step (a) to step (g) based on the first event.

2. The automatically sending digital image method of claim 1, wherein the sending mode is an individual sending mode, and the communication contact persons are set as the picture contact persons.

3. The automatically sending digital image method of claim 1, wherein the sending mode is a group sending mode, wherein multiple predetermined sending groups are set, each predetermined sending group includes multiple predetermined contact persons from the contact persons, and one of the predetermined sending groups is selected as a communication group based on the picture contact persons such that the communication contact persons are set as the predetermined contact persons of the communication group.

4. The automatically sending digital image method of claim 3, wherein the predetermined contact persons of the communication group include the picture contact persons.

5. The automatically sending digital image method of claim 4, wherein multiple selected sending groups are selected form the predetermined sending groups, wherein the predetermined contact persons of each selected sending group includes the picture contact persons, and the communication group is set as one of the selected sending groups such that the number of the predetermined contact person of the selected sending group are the least among the selected sending groups.

6. The automatically sending digital image method of claim 4, wherein multiple selected a plurality of sending groups are selected form the predetermined sending groups, wherein the predetermined contact persons of each selected sending group includes the picture contact persons, and the communication group is set as one of the selected sending groups such that the number of the predetermined contact person of the selected sending group are the most among the selected sending groups.

7. The automatically sending digital image method of claim 1, wherein the time period is four hours.

8. An automatically sending digital image apparatus, comprising:
- a storage module, wherein the storage module stores a plurality of contact person data, and each contact person data corresponds to a contact person and includes a face photograph and an E-mail address of the contact person;
- a gathering image module to gather a digital image, wherein the digital image is gathered by the gathering image module in a first event, and when no digital image is took by the gathering image module in a special time period, the first event terminates;
- an image processor receiving the digital image, wherein the image processor further comprises:
  - an image recognizing module to recognize a face picture of the digital image; and
  - an image comparison module to compare the face picture of the digital image with the face photograph of each contact person, wherein the contact person is set as a picture contact person when the face picture of the digital image matches the face photograph of the contact person; and
- a communication module to select multiple communication contact persons from the contact persons based on the picture contact persons according to a sending mode, and to attach the digital image an E-mail, wherein the E-mail is mailed to the E-mail addresses of the communication contact persons.

9. The automatically sending digital image apparatus of claim 8, wherein the sending mode is an individual sending mode, and the communication contact persons are set as the picture contact persons.

10. The automatically sending digital image apparatus of claim 8, wherein the sending mode is a group sending mode, wherein multiple predetermined sending groups are set, each predetermined sending group includes multiple predetermined contact persons from the contact persons, and one of the predetermined sending groups is selected as a communication group based on the picture contact persons such that the communication contact persons are set as the predetermined contact persons of the communication group.

11. The automatically sending digital image apparatus of claim 10, wherein the predetermined contact persons of the communication group include the picture contact persons.

12. The automatically sending digital image apparatus of claim 11, wherein multiple selected sending groups are selected form the predetermined sending groups, wherein the predetermined contact persons of each selected sending group includes the picture contact persons, and the communication group is set as one of the selected sending groups such that the number of the predetermined contact person of the selected sending group are the least among the selected sending groups.

13. The automatically sending digital image apparatus of claim 11, wherein multiple selected sending groups are selected form the predetermined sending groups, wherein the predetermined contact persons of each selected sending group includes the picture contact persons, and the communication group is set as one of the selected sending groups such that the number of the predetermined contact person of the selected sending group are the most among the selected sending groups.

14. The automatically sending digital image apparatus of claim 8, wherein the gathering image module is a charge coupled device (CCD) or a complementary metal oxide semiconductor (CMOS).

* * * * *